No. 886,587. PATENTED MAY 5, 1908.
A. DOW.
LINOTYPE MACHINE.
APPLICATION FILED JUNE 29, 1907.

8 SHEETS—SHEET 1.

Witnesses:
R. F. Barnes.
D. E. Burdine

Inventor
Alexander Dow
By her Attorney
P. T. Dodge

No. 886,587. PATENTED MAY 5, 1908.
A. DOW.
LINOTYPE MACHINE.
APPLICATION FILED JUNE 29, 1907.

8 SHEETS—SHEET 2.

Witnesses:
P. F. Barnes.
D. E. Purdiul

Inventor
Alexander Dow
By his Attorney
P. T. Dodge

No. 886,587.
A. DOW.
LINOTYPE MACHINE.
APPLICATION FILED JUNE 29, 1907.
PATENTED MAY 5, 1908.
8 SHEETS—SHEET 3.
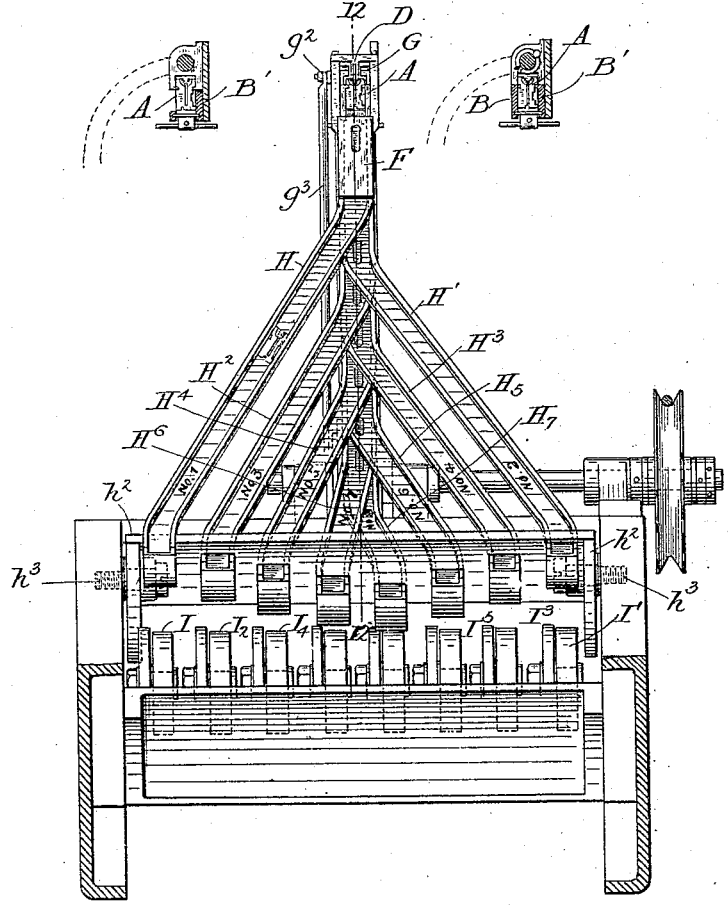

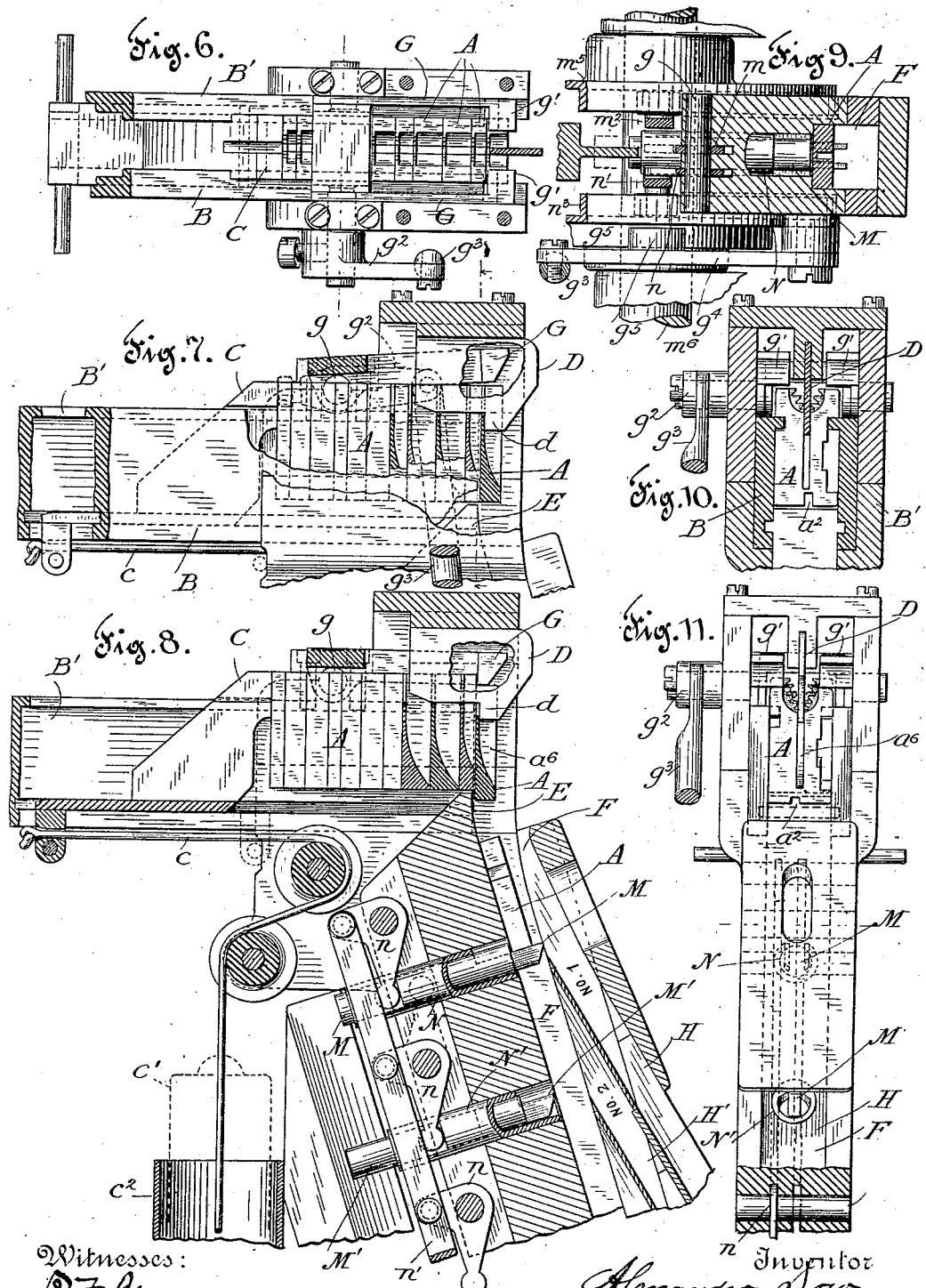

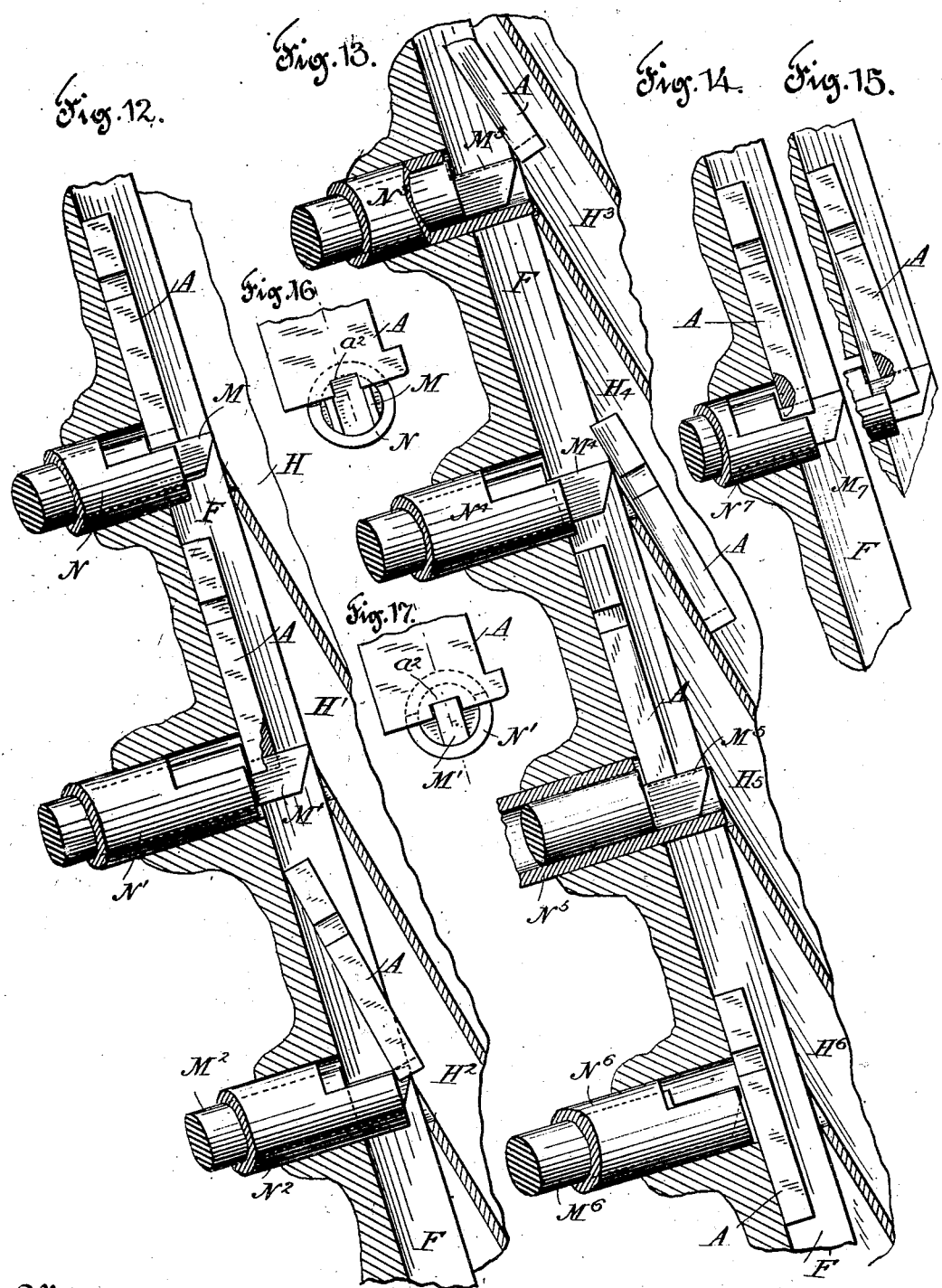

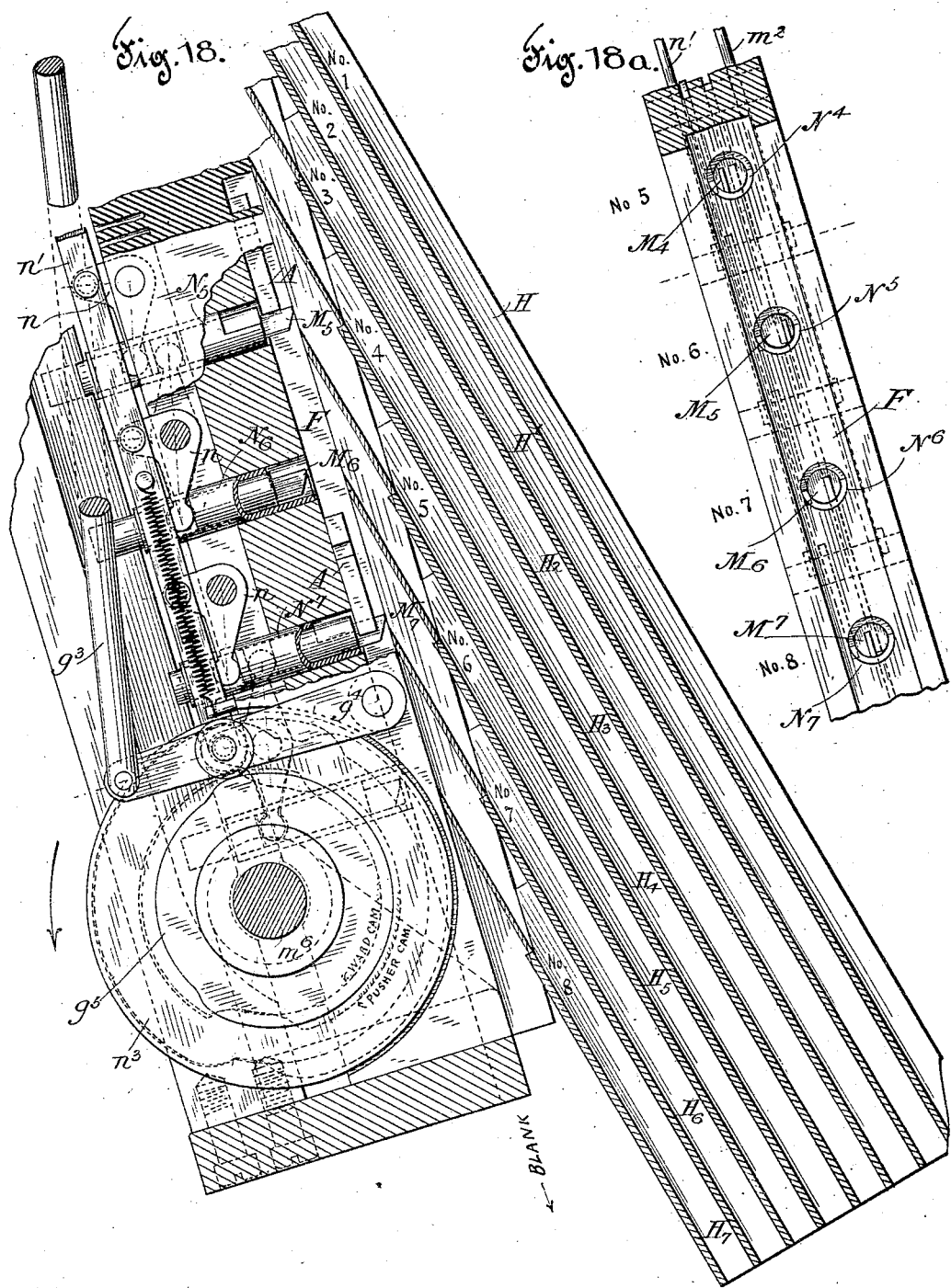

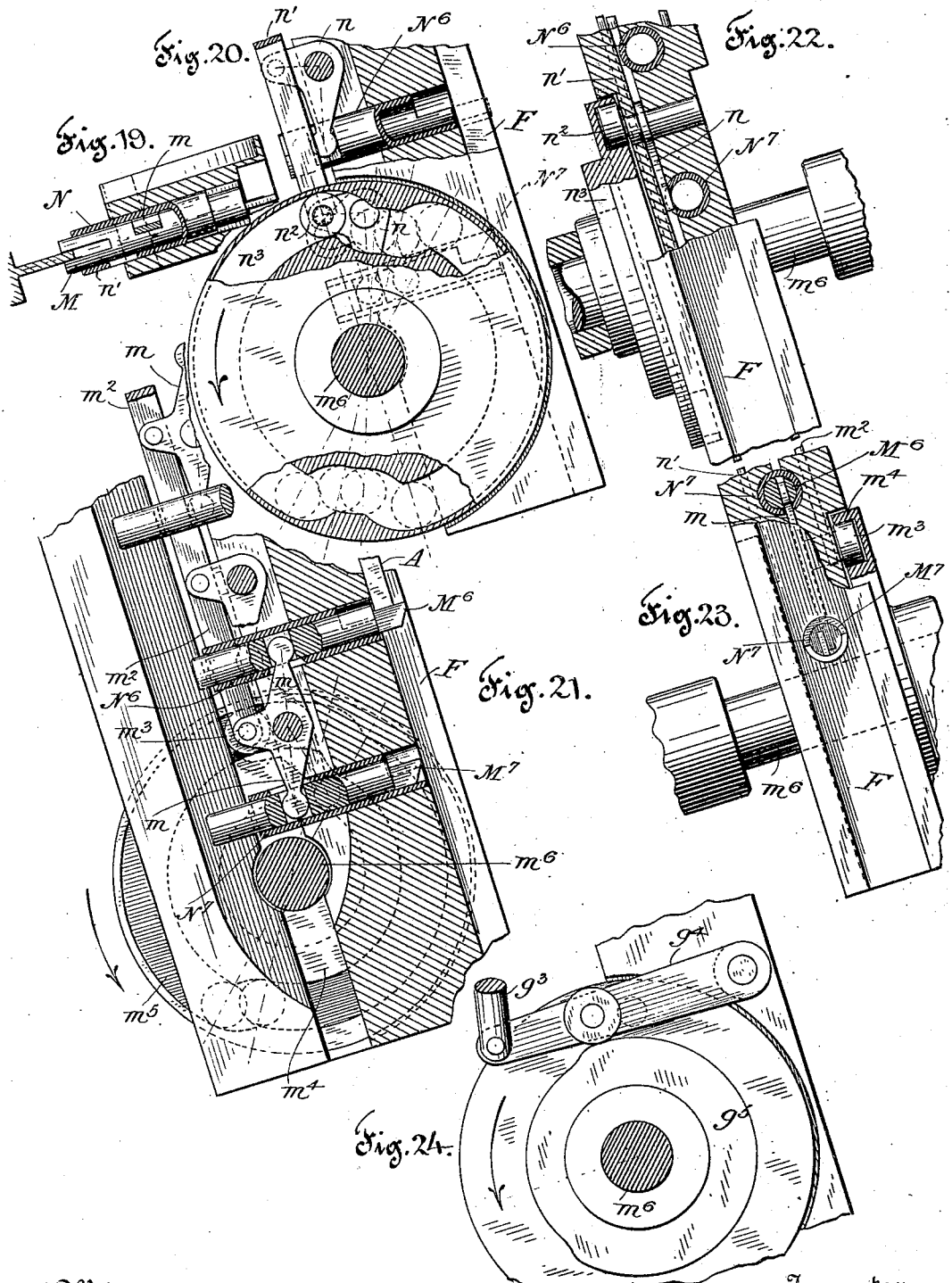

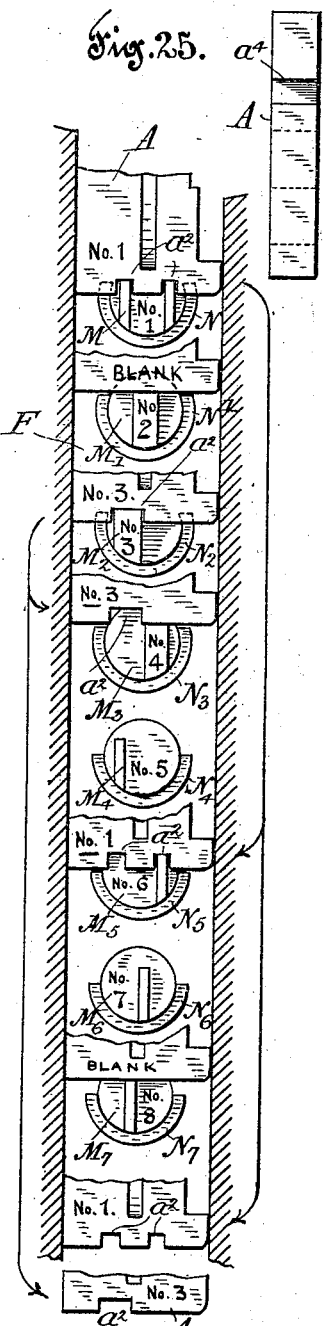

UNITED STATES PATENT OFFICE.

ALEXANDER DOW, OF NEW YORK, N. Y., ASSIGNOR TO MERGENTHALER LINOTYPE COMPANY, A CORPORATION OF NEW YORK.

LINOTYPE-MACHINE.

No. 886,587.     Specification of Letters Patent.     Patented May 5, 1908.

Application filed June 29, 1907. Serial No. 381,426.

*To all whom it may concern:*

Be it known that I, ALEXANDER DOW, of New York city, county of New York, and State of New York, have invented a new and useful Improvement in Linotype-Machines, of which the following is a specification.

My invention is intended more particularly for means for assorting or distributing matrices according to font, but is applicable also for the distribution of matrices according to characters or letters which they represent.

There are known in the art at the present day linotype machines in several forms having a series of magazines each containing a font or set of matrices. These machines are adapted to compose in one line matrices from two or more magazines, and it is necessary that these lines should be disintegrated and the matrices assorted according to font preparatory to their delivery to the distributing mechanisms, by which they are returned individually to their magazine channels. To this end, I provide the matrices with notches or equivalent distinguishing features varied according to font or letter. I provide a mechanism adapted to separate the matrices one at a time from the composed line, and direct them successively in a common path in which I arrange a series of movable stops one after another to arrest each matrix momentarily and repeatedly, each matrix being arrested sooner or later according to its peculiar distinguishing feature.

I also provide ejecting or switching devices by which the matrices arrested in the later or secondary positions, are delivered from a common path into divergent paths or channels, all matrices of like form being diverted through the same channel.

In the accompanying drawings. I have represented my improved mechanism in a form which has been operated in a satisfactory manner, but it is to be understood that the parts may be modified in form and in arrangement in many ways which will occur to the skilled mechanic, without passing beyond the limits of my invention.

Figure 1:
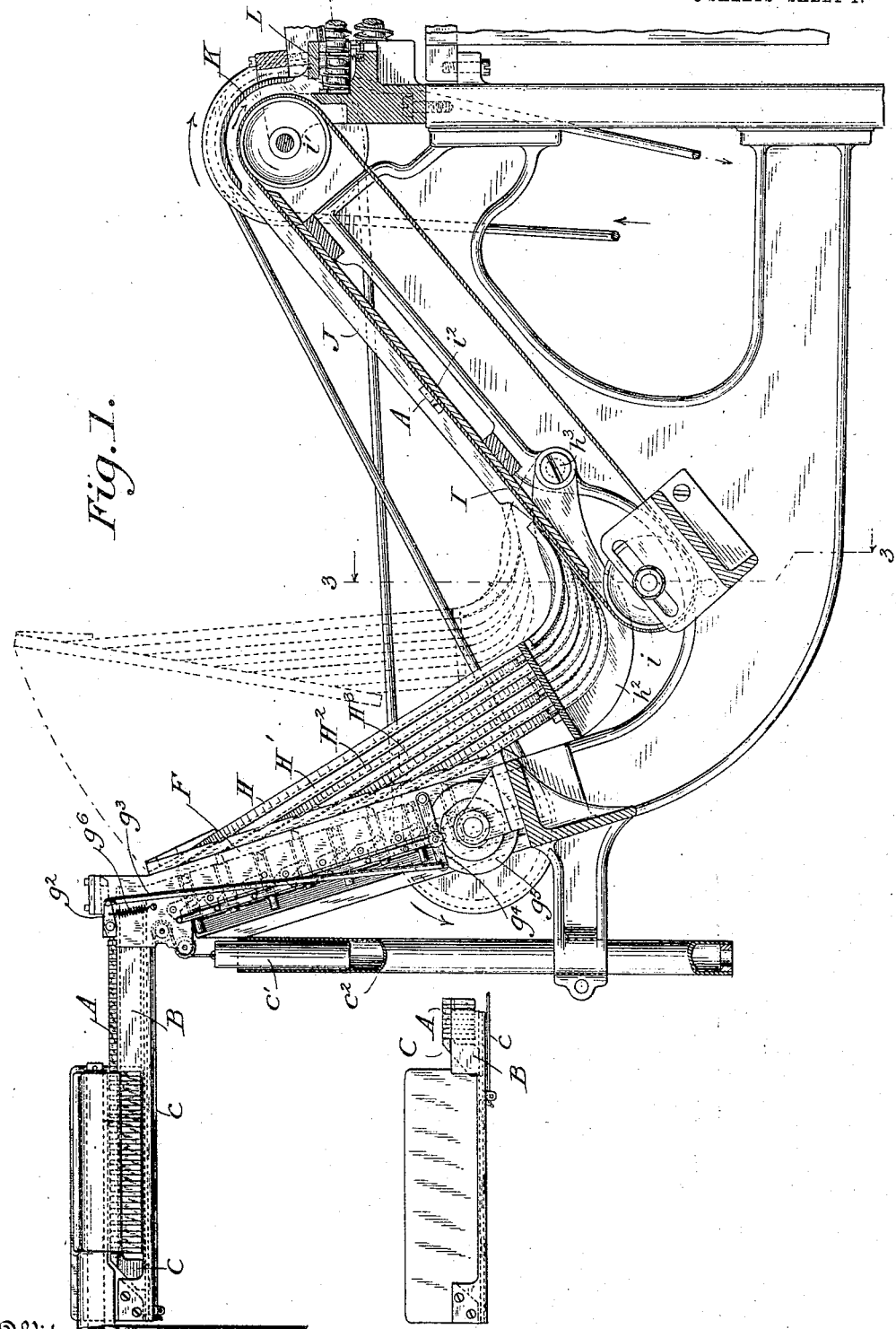
Figure 2:
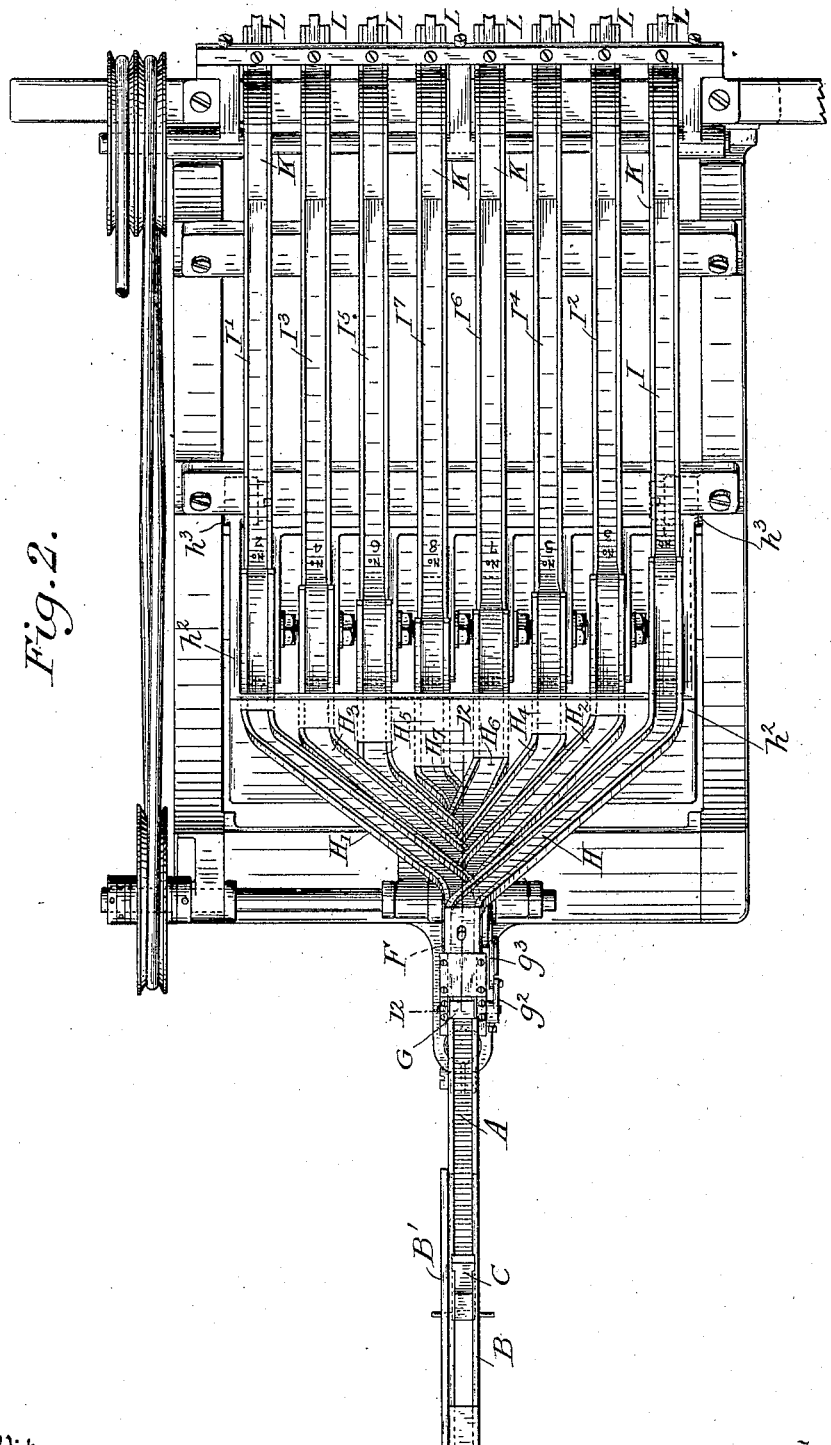

In the drawings,—Figure 1 is a side elevation of my distributing or assorting mechanism. Fig. 2 is a top plan view of the same. Fig. 3 is an elevation looking in the direction of the arrow from the line 3—3, Fig. 1, portions being shown in section. Figs. 4 and 5 are cross-sections on the correspondingly numbered lines, Figs. 1 and 2, showing details of the mechanism for feeding the line of matrices to the disintegrating devices. Fig. 6 is a plan view of the mechanism for disintegrating the composed line, portions being broken away to expose the internal parts. Fig. 7 is a side elevation of the same, with portions broken away. Fig. 8 is a vertical section through the parts shown in the two preceding figures, and also through the stops thereunder. Fig. 9 is a horizontal section on the line 9—9, Figs. 8 and 11, showing more especially the arrangement of the stops. Fig. 10 is a cross-section on the line 10—10, Fig. 7. Fig. 11 is an end view of the parts shown in Fig. 8 looking in the direction of the arrow 11. Figs. 12, 13, 14 and 15 are vertical sections through the matrix guide and the adjacent stopping and ejecting devices, showing various positions in which matrices are arrested and the manner in which they are delivered to the various channels, the section being taken on the line 12—12 of Figs. 2, 3, 9, &c. Figs. 16 and 17 are views looking endwise toward the stops and ejectors in the direction indicated by the arrows in Fig. 12. Fig. 18 is a vertical section through the matrix guide, the matrix stops and ejectors, and the mouths of the adjacent channels to which the matrices are switched or deflected, the devices for operating the stops and ejectors being shown. Fig. 18ª is a face view of a front elevation of the matrix guiding channels with the stops and ejectors therein. Figs. 19, 20 and 21 are vertical sections through the matrix guide, the stops and the ejectors, showing further details. Figs. 22 and 23 are views of the parts shown in Figs. 19 to 21, looking in the direction of the arrows indicated in said figures, with portions broken away to expose the internal construction. Fig. 24 is an elevation of the cam and connections for imparting motion to the parts shown in the figure immediately preceding. Figs. 25, 26 and 27 are views illustrating the form and arrangement of the various notches which distinguish the matrices, and also the forms of the various stop devices and ejectors to coöperate therewith, in order that the matrix of a given form, that is to say, having distinguishing features, may be delivered at one point and no other. Fig. 28 is a view showing one edge of a matrix. Fig. 29 is a view showing the opposite edge.

The matrices with which my mechanism is designed to operate are preferably made of the form shown at A, Figs. 26, 28 and 29; but they may be varied in form as desired, provided only they contain the distinguishing or distributing features, and are adapted to pass through the mechanism.

Each matrix in the form shown consists of a flat plate of metal, having a generally rectangular form, with the matrix $a$ in one edge, the distributing teeth $a'$ at the upper end, the sustaining shoulders $a^4$ near the upper end, and with one or more notches $a^2$ in the lower end. These lower notches, which constitute the distinguishing or distributing features of the matrix, are the only features which are of importance in connection with the present invention. Each matrix is also provided with a longitudinal central slot $a^6$ of such depth that the portion remaining beyond the slot is of uniform thickness in all matrices regardless of their thickness.

The particular mechanism shown in the drawings is designed for distributing matrices according to font and regardless of the letters or characters represented by them. I have shown the matrices as belonging to eight sets or fonts, and all those belonging to any one set or font (except one) are provided, regardless of the letters or characters they represent, with the same distinguishing features or notches. The blank matrices or spaces or the matrices belonging to one of the fonts may be made continuous or without notches in the lower ends, as shown at Nos. 2 and 8, Figs. 25 and 26. All the other matrices are provided with one or two of the distinguishing notches in the lower end. There may be a pair of notches, as shown in matrices No. 1 in said figures; or a single broad notch centrally located in the matrices No. 2; or a broad notch located on the left of the center, as shown in matrices No. 3; or a broad notch on the right of the center, as shown in matrices No. 4; a narrow notch on the left, as shown in matrices No. 5; a narrow notch on the right, as shown in matrices No. 7; or notches located as in No. 8. The only requirement in this regard is that the notches in matrices of different fonts shall differ in size or in location in such manner that each of the stop devices hereinafter described will arrest matrices of different forms in different positions, or in other words, in different relations to the ejecting devices, so that each of the latter will act to deflect matrices of one form only.

Passing now to the mechanism for separating the matrices, attention is directed particularly to Figs. 1, 2, 3, 6, 7, 8, 10 and 11. The first part of the mechanism consists of the means for separating the matrices individually from the line and directing them to the common guide or channel. This is constructed as follows. B, B', are two horizontal stationary rails or guides flanged to engage and sustain the matrices introduced between them, as shown in Figs. 4 and 5, so that the composed line, containing matrices of different fonts, may be introduced between these rails, sustained by them, and advanced endwise toward the disintegrating devices. The means for introducing the matrices between the guides are foreign to the present invention. C is a follower or pressure device guided between the rails and acting against the rear end of the matrix line for the purpose of pushing the same forward, this special device being actuated by a cord $c$ passed over suitable guide-pulleys and provided with a weight $c'$ suspended in the stationary guiding tube $c^2$. The tendency of these parts is to constantly urge the line forward with a gentle pressure. D is a fixed vertical finger or plate centrally located over the matrix guides and having a depending shoulder $d$ in position to enter the slot in the foremost matrix, and by engaging the same, arrest the advance of the line. E is a fixed plate or finger located in such position that the matrix line passes thereover, its upper forward edge being terminated just behind the rear face of the foremost matrix, as clearly shown in Figs. 6 and 7, so that the forward matrix and no other may be driven downward from the end of the line. Owing to the existence of the slot $a^6$ in the matrices, the foremost matrix, whether thick or thin, is permitted to advance to such point that its rear face will clear the stop-plate E. In the absence of the slot $a^6$, it would be obviously impossible to effect the delivery of single matrices of different thicknesses. G is a ⊐-shaped depressing finger overlying the line and turning on horizontal trunnions $g$. This finger has its two arms extended forward and provided at their forward ends with inwardly extending lips $g'$ to act on the upper end of the foremost matrix only, so that when the finger is depressed from the normal position shown in Fig. 7 to the position shown in Fig. 8, it will push the foremost matrix downward below its companions past the fixed plate E until it is disengaged from the stop-shoulder $d$, whereupon the matrix, being free from restraint, will descend the guide or channel F by gravity.

As soon as each matrix is discharged from the end of the line, the line moves forward and the second matrix assumes the position vacated by the first, and is in its turn discharged in like manner.

The depressing finger may be operated in any suitable manner, but I prefer to provide one of its trunnions with a crank-arm $g^2$ connected to a rod $g^3$, which is extended downward as shown in Fig. 1 to a lever $g^4$ pivoted to the frame and provided at its middle with an anti-friction roller riding on a lifting cam $q^6$ which acts in opposition to a spring $q^6$, by which the parts are urged downward. The cam $q^5$, through the intermediate parts, repeatedly lifts the spring $q^6$ to cause the moderately rapid vibration of the depressing finger, so that the matrices are delivered in rapid succession from the line into the channel F.

The channel F, through which all the matrices descend in succession, is formed in a solid portion of the framework. After the matrices enter this channel, it is necessary that they should be separated according to font, and those of different fonts delivered to different distributing mechanisms. For this purpose I provide a series of secondary guides or channels H, H', &c. All of these channels begin, as shown in Figs. 1, 2 and 3, directly in front of the open side of channel F, in position to receive matrices therefrom at different heights through the action of the ejecting devices hereinafter described, and they are deflected successively to the right and left, as shown in Fig. 3, their lower ends being turned forward and arranged to deliver the matrices to the respective carrier-belts I, I', &c. These carrier-belts pass between stationary upright plates J, which keep the matrices in place thereon. The belts are carried at their ends around supporting pulleys $i$, $i'$, and are sustained by stationary underlying plates $i^2$ to prevent them from sagging. The matrices entering the respective channels H, H', &c., are delivered to the corresponding belts, and by the latter delivered through curved vertical channels K to the distributing mechanisms L for different magazines, which may be of the construction shown in my application Serial No. 381,276, of even date herewith, or to any other suitable distributing mechanism, this mechanism forming no part of the present invention.

I will now describe the stops and ejectors which coöperate with the notched matrices to determine the delivery of each matrix according to the font to which it belongs, to one or another of the channels H, H', &c.

M, M', &c., are a series of reciprocating stops or detectors located at different heights and each arranged to be projected at frequent intervals into the passage F' to arrest the descending matrices, these parts being so timed that each matrix in the course of its descent, is repeatedly arrested by the successive stops, until it finally arrives at the point at which it is to be ejected into one of the channels H, H', &c.

At their forward ends, the stops differ in their sectional form, each one being adapted to enter the notches in matrices of one font and no other, as plainly shown more particularly in Figs. 12 to 17 and 25 to 27.

If the notch or notches in a descending matrix correspond in form and location with the stop by which it is arrested, the stop will enter the notches and permit the end of the matrix to descend below the top surface of the stop, as shown for example at No. 1 in Fig. 25, and Nos. 2, 4, 5, 6 and 7 in Fig. 27, and also in Figs. 14, 15 and 17. If, however, the end of the stop differs in form or in location from the notches of the matrix which is for the moment arrested thereby, the lower end of the matrix will be sustained on a level with the top of the stop, as in the case of stops No. 4 in Fig. 25, and No. 3 in Fig. 27.

It is to be observed that the above mechanism arrests each matrix repeatedly, and that each arrest occurs a little sooner or a little later according to the form of the matrix.

The matrices are stopped in the first or primary position in order to prevent them from being acted upon by the ejecting devices hereinafter described, before they arrive opposite the secondary channels in which they belong.

N, N', &c., represent the reciprocating ejectors which in the present instance, are made of tubular form and seated in the frame around the stops M, as shown in the several figures. Each of these ejectors, which are also projected alternately into the matrix channel F, have their forward ends cut away on the upper side in such manner that if a matrix is arrested on top of the stop M, as shown for example at the top of Fig. 12 and in Fig. 16, the ejector may pass forward under the end of the arrested matrix without action thereon, as shown in Fig. 14. This will occur whenever a matrix is arrested opposite any one of the secondary channels H, H', &c., into which it should not be delivered. If, on the other hand, the notched end of the matrix corresponds in form with the stop and settles down astride of the same, the lower end of the matrix will stand in the path of the ejector N, which will thereafter advance, and acting against the lower end of the matrix positively, eject or switch the same from the channel F, in the manner shown at the upper end of Fig. 13 and elsewhere, into the secondary channel H, through which it will descend to the carrier-belt I. Thus it will be seen that each matrix, descending the channel F, may be arrested repeatedly in such position that it will not be acted upon by the adjacent ejector until it arrives at the point where it straddles the stop and advances so far that the ejector may act upon it.

The essence of my invention lies in the employment of a series of stops each of which will arrest the matrices of one form in a different position from that in which it arrests the others, and in combining with such stop devices means for ejecting or deflecting at each point the arrested matrices of one form only.

It is obvious that the stops M and ejectors

N may be widely varied in form, and that they may be actuated by any suitable mechanism, the only requirement being that the stops shall be successively ejected and retracted and that the ejectors shall operate only on those matrices which are arrested in position to be deflected.

I recommend as a suitable means for operating the stops and ejectors, the mechanism shown more particularly in Figs. 1, 8, 19, 20, 21, &c. Each of the stops M is notched to receive the end of an actuating lever $m$ entering loosely through a slot in the surrounding ejector N. Each of these levers is centrally pivoted and formed with three arms, two of them serving to actuate two of the stops M, while the third arm is jointed to a reciprocating actuating bar $m^2$ seated in a groove in the frame and common to the entire series of levers. It will be observed that the reciprocation of this bar has the effect of projecting each alternate stop, and at the same time retracting the intermediate stops, this action permitting each matrix to descend the channel step by step from each stop to the next.

The bar $m^2$ receives motion through a roller $m^3$ on its lower end from a cam-wheel $m^4$ having a cam-groove $m^5$ in its side face and mounted on shaft $m^6$, as shown in Figs. 13 and 21.

The tubular ejectors N are actuated as shown in Fig. 20, by angular levers $n$ pivoted in the main-frame and jointed to a reciprocating bar $n'$, which is seated in a groove in the main-frame and actuated by a roller $n^2$ secured to its lower end and seated in a cam-groove $n^3$ in the side face of a cam-wheel, mounted on shaft $m^6$, before mentioned. This cam-groove is of such form as to give two reciprocations to the bar $n'$ during each revolution of the cam. In other words, the ejectors are projected twice as often as the stops. This is done because it permits of a very simple construction of the parts, and because it insures the ejection of a matrix which is in the ejecting position on any one of the stops, which latter it will be remembered are actuated alternately throughout the series.

*General operation.*—The composed lines of matrices are introduced successively between the guides B, B', and while supported thereby, are urged forward by the follower C. The matrix, which is for the moment at the front end of the line, is arrested by the shoulder $d$, as shown in Fig. 7, and further advance of the line prevented.

The depressor G descends and forces the forward matrix out of engagement with the shoulder $d$, thereby releasing it so that it may descend the channel F, the descent of the next matrix in the line being prevented by the underlying plate E and also by the guides B, B', which are cut away at the forward end an amount sufficient to prevent the escape of the forward matrix only. As soon as the first matrix is delivered, the depressor G rises and the entire line advances until the second matrix assumes the position vacated by the first and is arrested in its turn by the shoulder $d$. The operation is repeated in rapid succession and the matrices delivered one after another into the channel F.

Each matrix first encounters and is arrested by the uppermost stop M, and if its notch conforms to the stop, it will descend far enough to be acted upon by the advancing ejector N and delivered from the channel F into the secondary channel H, whence it passes to the conveyer-belt and thence to the proper distributing mechanism. If, however, the notch in the lower end of the matrix does not permit it to straddle the stop M, the ejector N advances beneath it and without effect upon it, and when the ejector and the stop are withdrawn, the matrix continues its downward course until arrested by the next stop M', and so on repeatedly until it finally arrives at the corresponding stop, when it will descend thereon far enough to be delivered by the ejector. In this manner, each matrix is delivered positively to its appropriate secondary channel and no other, and its delivery to the distributing mechanism of the proper magazine is insured.

The series of secondary channels H, H', &c., are preferably fastened together and supported upon a base-frame $h^2$ connected to the main-frame by horizontal pivots $h^3$, so that the entire series of channels may be swung upward and forward to the position indicated by dotted lines in Fig. 1, in order to give access to their receiving ends and to the parts located beneath them, to facilitate the removal of lodged matrices or foreign bodies.

The various parts hereinbefore described constitute the essential elements of my mechanism, and they may be mounted on a main-frame or support such as shown in the drawings, or of any other suitable form or construction.

Having described my invention, I claim and desire to secure by Letters Patent:—

1. In a mechanism for assorting matrices, a guide or channel through which all the matrices are successively delivered, a transversely movable device for arresting each matrix sooner or later according to its form, and adjacent means also movable transversely of the guide for positively delivering therefrom those matrices only which are arrested in the later position.

2. In a mechanism for assorting matrices, a guide or channel, means for delivering all the matrices endwise in succession through said guide, a periodically reciprocated stop acting to arrest each matrix sooner or later according to its form, and a periodically actuated ejector for delivering the matrices arrested in the later position.

3. In a mechanism for assorting matrices, a guide or channel adapted to permit the passage of matrices endwise therethrough by gravity, means for delivering the matrices successively thereto, stops of variant forms located at different points in the length of the channel and each adapted to arrest each of the passing matrices sooner or later according to its form, and ejectors acting to deliver the matrices arrested in one of said positions only.

4. In a mechanism for assorting matrices, the combination of a guide or channel, means for delivering the matrices successively to said channel, reciprocating ejectors located at different points in the channel to deliver the matrices positively therefrom, and reciprocating stops of different forms located adjacent to the ejectors; whereby the action of each ejector is limited to matrices of one form only.

5. In a mechanism for assorting matrices, means for guiding the matrices successively in a common path, retractable stops located at different points in the length of said path and differing in form to arrest each matrix in one position or another according to its form, and ejectors located adjacent to the stops, substantially as described.

6. In a mechanism for assorting matrices, means for guiding the matrices successively in a common path, a series of retractable stops located at different points in said path, and each adapted to arrest an advancing matrix sooner or later according to the form of the matrix, and means for delivering those matrices which are arrested in the foremost position.

7. In a mechanism for assorting matrices, means for delivering the matrices successively in a common path, means for repeatedly arresting each matrix in the course of its advance sooner or later according to form, and means for ejecting the arrested matrices, each ejecting device acting to deliver matrices of one form only.

8. In combination, a series of matrices comprising matrices differing in form, means for delivering the matrices successively and separately in a common path by gravity, a series of ejectors for delivering the matrices from said path at different points, and means for repeatedly stopping the matrices and presenting matrices of different forms in position to be acted upon by the corresponding ejectors only; whereby matrices of different forms are delivered at different points.

9. In a mechanism for assorting matrices, the combination of a matrix guide F, alternately reciprocating stops M, differing in form, and adjacent reciprocating ejectors N.

10. In a matrix assorting mechanism, a series of alternately reciprocating stops M differing in form, the adjacent reciprocating ejectors N, and means for imparting to each ejector two movements for each movement of the stops; whereby the matrices are permitted to advance step by step from one stop to another and the ejectors caused to advance each time the matrix is arrested.

11. In a matrix assorting mechanism, means for guiding the matrices in a common path, a reciprocating tubular ejector to deflect the matrices from said path, and a reciprocating stop M located within the ejector.

12. In a mechanism for assorting matrices, means for guiding the matrices successively in a common path, a series of mechanically actuated variant stops to repeatedly arrest each matrix, a series of mechanically actuated ejectors to deflect the arrested matrices at one point or another according to their form, and a series of secondary guides or channels to which the matrices are delivered by the ejectors.

13. In combination with the reciprocating stops, the levers each arranged to actuate two stops, and an actuating device common to all the levers; whereby the stops are advanced alternately throughout the series to the end that the matrices may be caused to advance step by step.

14. In combination with means for guiding the matrices in a common line, means for delivering the matrices successively thereto, a series of stops for arresting the matrices in different positions, a series of ejectors adjacent to the respective stops, and an actuating mechanism common to the delivering devices, the stops and the ejectors; whereby they are compelled to move at the proper times and in the proper relations to effect the stoppage and ejection of the matrices.

15. A series of matrices provided with slots $a^6$, as described, in combination with means for supporting and advancing the composed line of such matrices, a stop-shoulder $d$ adapted to enter the slot of the foremost matrix and limit the advance of the line, a stationary stop E to hold the second matrix, and means for moving the forward matrix out of engagement with the shoulder $d$ and past the stop E, substantially as described.

16. In combination with a support for a composed line of matrices and means for advancing the line endwise therein, a fixed stop-shoulder $d$ to engage the upper end only of the foremost matrix, a fixed stop E underlying the second matrix, and a depressor G arranged to carry the foremost matrix clear of the shoulder $d$, whereby the matrices are released from the line by a short movement, and permitted to escape by gravity.

17. In combination with a series of distributers, conveyers for delivering matrices to the respective distributers, a series of guides leading from a common line to the respective conveyers, means for delivering the matrices successively from the end of a composed line, and means for directing the matrices according to their forms to the respective guides.

18. In combination with means for advancing a composed line of matrices endwise, the matrices provided with notches $a^6$, a stop $d$ adapted to enter the notch of the foremost matrix and thereby arrest the advance of the line, and means to act upon the foremost matrix to carry the same downward clear of the stop.

19. In a mechanism for assorting matrices, the combination of means for guiding and advancing the composed line, a central stop adapted to engage the upper end of the foremost matrix, a bottom support E lying behind the foremost matrix, and a vibratory depressor G overlying the line, having its end forked, and adapted to act on the two edges of the foremost matrix.

In testimony whereof I hereunto set my hand this twentieth day of June, 1907, in the presence of two attesting witnesses.

ALEXANDER DOW.

Witnesses:
 G. W. BIRD,
 FRANK C. JONES.